United States Patent [19]

Yasui

[11] Patent Number: 5,185,507
[45] Date of Patent: Feb. 9, 1993

[54] WIRE ELECTRIC DISCHARGE MACHINING METHOD FOR MACHINING ENTRANCE LINES AND APPARATUS THEREFOR

[75] Inventor: Noriya Yasui, Aichi, Japan

[73] Assignee: Mitsubishi Denki K.K., Tokyo, Japan

[21] Appl. No.: 794,957

[22] Filed: Nov. 20, 1991

[30] Foreign Application Priority Data

Nov. 20, 1990 [JP] Japan .................................. 2-315074

[51] Int. Cl.⁵ .............................................. B23H 7/06
[52] U.S. Cl. .................................................. 219/69.12
[58] Field of Search ............... 219/69.12, 69.17, 69.13, 219/69.16; 364/474.04

[56] References Cited

U.S. PATENT DOCUMENTS

| 4,700,314 | 10/1987 | Kinoshita | 219/69.12 |
| 4,703,143 | 10/1987 | Okubo et al. | 219/69.12 |
| 4,837,415 | 6/1989 | Magara et al. | 219/69.12 |
| 5,047,606 | 9/1991 | Hiramine | 219/69.12 |
| 5,072,088 | 12/1991 | Watanabe | 219/69.12 |

FOREIGN PATENT DOCUMENTS

| 53-136797 | 11/1978 | Japan | 219/69.12 |
| 58-171220 | 10/1983 | Japan | 219/69.17 |
| 58-217228 | 12/1983 | Japan | 219/69.17 |

Primary Examiner—Geoffrey S. Evans
Attorney, Agent, or Firm—Sughrue, Mion, Zinn, Macpeak & Seas

[57] ABSTRACT

A machining method and apparatus for avoiding the double machining by a wire electrode of the same point on the desired contour of a workpiece, particularly the point where a predetermined entrance line intersects with the desired contour. The predetermined entrance line locus is automatically modified on the basis of the parameters of the workpiece and electrode such that at least a portion of the modified entrance line locus intersects the desired contour at an obtuse angle or a tangent, that portion of the modified locus being a curve or a straight line. The return locus from the desired contour to the entrance line also may be modified in addition or instead of the entrance line. The electrical parameters of the machining may further be monitored and modified in order to avoid intrusions of the desired contour.

13 Claims, 3 Drawing Sheets

WIRE ELECTRIC DISCHARGE MACHINING METHOD FOR MACHINING ENTRANCE LINES AND APPARATUS THEREFOR

BACKGROUND OF THE INVENTION

1. Field of the Invention

This invention relates to a wire electric discharge machining method for machining an entrance line to accurately intersect with a desired contour shape and an apparatus therefor.

2. Description of the Background Art

FIG. 4 is a block diagram showing a conventional wire electric discharge machining apparatus. In FIG. 4, reference numeral 1 denotes a wire electrode, 2 a workpiece to be machined in a programmed arbitrary shape by the wire electrode 1, 3 machining solution supply nozzles, 4 an arm for securing the upper machining solution supply nozzle 3, 5 an arm for securing the lower machining solution supply nozzle 3, 6 a pulley for altering the advancing direction of the wire electrode 1, 7 a machining solution tank, 8 a machining power source, 9 a table feed control unit for controlling the movement of a table for holding the workpiece 2, 10 a machining solution control unit, 11 a CPU for controlling the power source 8, the table feed control 9 and the machining solution control unit 10, and, finally, 12 a memory.

FIG. 5 shows a programmed machining route, in which a solid line indicates an already machined portion, and a broken line indicates a portion to be machined. Instructions for controlling the sequential movement of the workpiece 2 with respect to the electrode 1, often as a series of linear and/or curved loci, are stored in memory and retrieved to control the machining operation. FIG. 6 is an enlarged view of a portion A of FIG. 5.

In the operation of the conventional wire electric discharge machining apparatus, the wire electrode 1 and the workpiece 2 are opposed at a predetermined gap, and the wire electrode 1 is fed from a position above to a position below the workpiece 2. An electric discharge is produced in the gap between the wire electrode 1 and the workpiece 2 by electric energy supplied from the power source 8, through the machining solutions that are supplied from the upper and lower machining solution supply nozzles 3. The workpiece 2 is machined in a predetermined sequence to have an arbitrary shape, as shown in FIG. 5, based on instructions stored beforehand in the memory 12. The machining solutions are controlled to have desired machining solution parameters (e.g., pressure) by the machining solution control unit 10, and are supplied from the machining solution tank 7 to a location between the wire electrode 1 and the workpiece 2 from the upper and lower machining solution supply nozzles 3. As shown in FIG. 5, the shape programmed in advance is formed by controlling movement of the machining table, to which the workpiece 2 is secured, by the table feed control unit 9. The CPU 11 generally controls the power source 8, the table feed control unit 9 and the machining solution control unit 10.

With reference to FIG. 5, assume that the machining of a contoured hole having the shape of a square in a solid workpiece 2 is desired. First, a starting hole at point P1 in the portion of the workpiece 2 to be removed is formed by drilling or the like and the wire electrode 1 is threaded through the hole P1 for attachment between nozzles 3. Then, the wire electrode 1 is conveyed from a spool above the workpiece 2 for collection at a location below the workpiece. Machining solutions are supplied by machining solution control unit 10 from the machining solution tank 7 via the nozzles 3 to a location between the wire electrode 1 and the workpiece 2. Initially, the solution is supplied to the starting hole P1, the point where machining will begin. Then, electric energy is supplied from the power source 8 to start machining.

In accordance with a first machining instruction, the wire electrode is advanced from the starting hole along a predetermined machining entrance line (P1-P2). The entrance line intersects with, and in the example forms a 90° angle with, the desired contour machining line between points P2 and P3. Then, in accordance with a second machining instruction, at point P2, the path of the electrode is changed and the workpiece 2 is continuously machined from the point P2 to a point P3. The machining proceeds to completion in response to a further series of instructions that returns the machining along line L1.

Since the line from the point P1 to the point P2 is only the entrance line, the point P2 actually is the starting point for machining the desired contour shape using the wire electric discharge machining apparatus. As the machining is continued according to the predetermined program, the hole is formed in a desired contour shape. As machining of the contour shape nears completion, the machining path returns along line L1 to the point P2. At point P2, the machining of the contour shape is completed, and the machining is considered finished, or the machining is further continued and a secondary machining is executed.

Clearly, the point P2 is both the contour shape starting point and the contour shape finishing point. Accordingly, the same point is machined twice. If the same point is machined twice under the same electric conditions, when the electric energy is supplied from the power source 8 to a point which already has been once machined, an electric discharge again occurs at the same point. However, the electric discharge gap due to the electric discharge is different from the gap that exists at a point which is machined only once. As a result, the point P2 is excessively machined and the workpiece 2 will have a defect at that point.

Since the conventional wire electric discharge machining apparatus is constructed and machined as described above, the point P2 on the machining line that is machined twice will be different from the point P3 which is machined only once. Specifically, the machined shape of the workpiece will be intruded at the point P2.

The present invention contemplates to solve the above-described problem and has as an object the provision of a wire electric discharge machining method and an apparatus therefor which can improve the machining accuracy of a workpiece without intrusion of a machining shape of the workpiece.

SUMMARY OF THE INVENTION

The present invention is a method and apparatus for modifying the control parameters of a predetermined wire cut machining program in accordance with the electrode and workpiece parameters, so that the generation of an intrusion in the workpiece is avoided when the same point is machined twice.

More specifically, the invention is a method and apparatus for modifying the parameters defining a machining along a predetermined entrance line to its intersection with a desired contour shape machining so that an intrusion is not formed when the same point is machined twice.

In particular, the parameters defining locus of travel of the machining along the entrance line are modified so that the machining departs from the original entrance line locus and intersects the desired contour shape at an obtuse angle or a tangent. Preferably, the modified machining will depart from the original entrance line locus and then cross that locus before intersecting the desired contour shape at an obtuse angle or tangent and beginning the machining of the desired contour shape. The parameters defining the locus of travel of the machining, as the desired contour shape is completed and the machining approaches the entrance line, also are changed so that the machining departs from the desired contour shape and crosses the original entrance line at a point displaced from the intersection of the original entrance line and the contour shape. The changed parameters can define travel along a straight or curved locus.

Finally, the parameters defining the power provided to the machining electrode can be modified as the electrode nears the point of intersection between the entrance line and the desired contour shape, so that intrusion due to over machining can be minimized.

DESCRIPTION OF THE PREFERRED EMBODIMENTS

The embodiments of the present invention will be described with reference to accompanying drawings.

Figure 1:
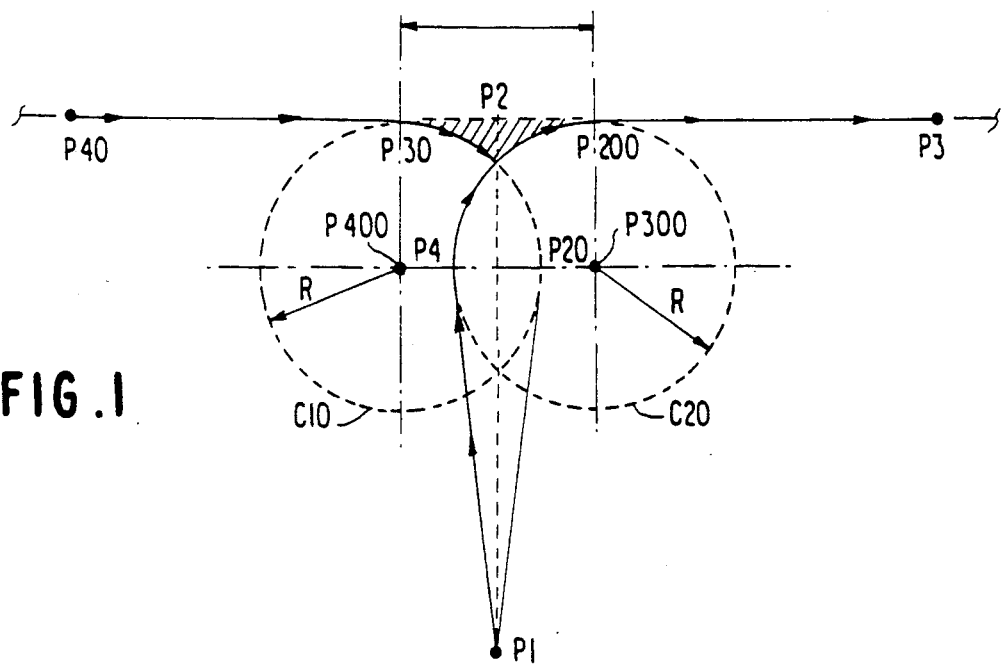
FIG. 1 is a schematic view for explaining a wire electric discharge machining method according to an embodiment of the present invention.

FIG. 1 is an illustration for explaining an embodiment of a wire electric discharge machining method of this invention. In FIG. 1, P1 denotes a machining starting point at the beginning of a preprogrammed entrance line that will intersect with a desired contour shape having at least points P2, P3 and P40. The electrode will move from point P1 along a path that includes points on a machining line for the workpiece to be machined. The actual machining path is identified by a solid line and the broken line denotes a portion of the relevant geometry which is not considered a part of the actual machining route. For example, points P300 and P400 denote the centers of circles each having a radius R and defining a respective circumference C10 and C20. Each circumference comprises arc-shaped machining lines having points P30, P100 and P20 as well as points P4, P100 and P200, respectively, and are tangential to the desired contour line. The machining from the starting point P1 departs from the preprogrammed entrance line P1-P2 and, beginning at point P4, follows a locus that crosses the original entrance line at P100 before intersecting with the desired contour shape at point P200. Similarly the machining of the desired contour shape departs from the preprogrammed locus prior to reaching point P2 and follows a modified return path that intersects with the original entrance line at point P100, a distance from point P2. The amount of departure from the original entrance line and the location of the intersection point P1, and/or the modified return path may depend on the electrode size, power, workpiece material, etc. and may be stored in look up tables for access by a control unit.

Figure 2:
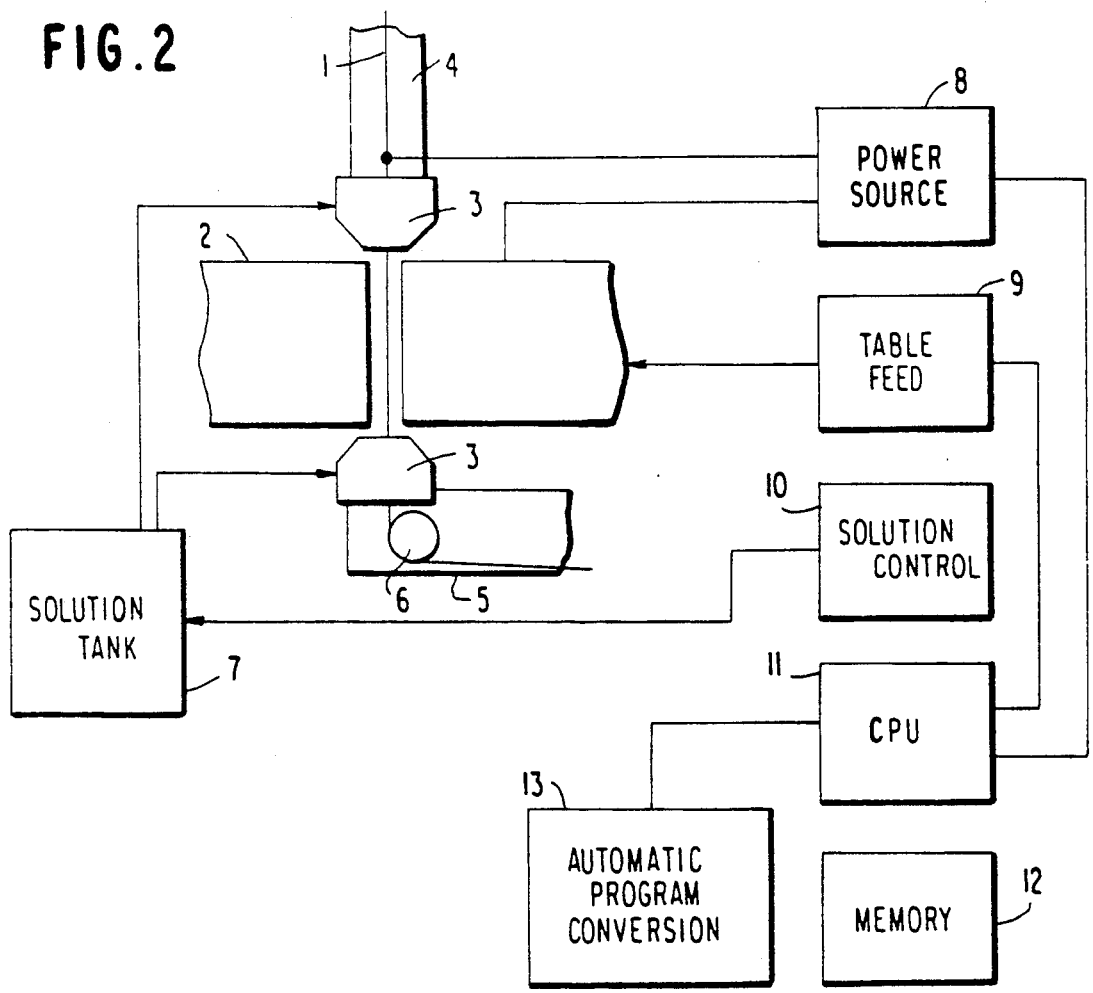
FIG. 2 is a block diagram of an apparatus according to the present invention.
Figure 4:
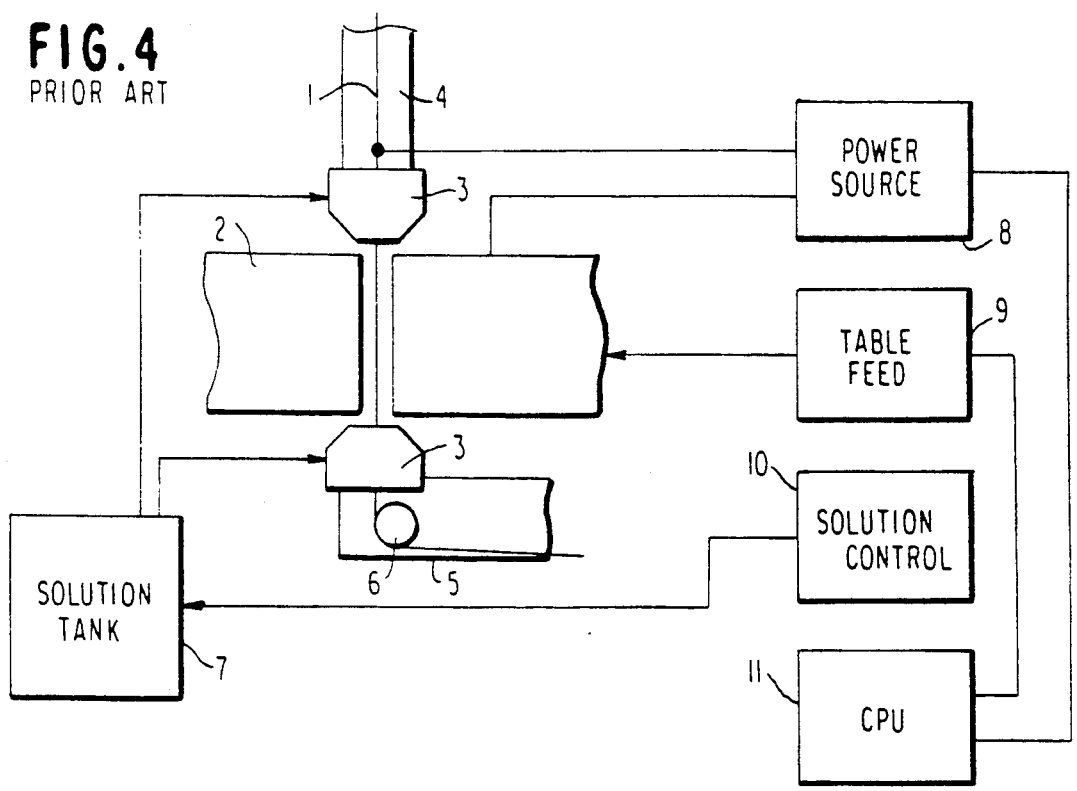
FIG. 4 is a block diagram of a conventional wire electric discharge machining apparatus.

FIG. 2 is a block diagram showing an embodiment of a wire electric discharge machining apparatus of the present invention. In FIG. 2, the same reference numerals as those in FIG. 4 denote the same or equivalent components. In FIG. 2, reference numeral 13 denotes program automatic converting unit for automatically altering or converting the program for a predetermined machining line that has been defined in advance and stored in a memory 12. Furthermore, the automatic converting unit may be operative to automatically change the electrical parameters of the machining operation so that an overcut can be prevented. The adjustment of the machining line and electrical parameters can be made separately or in combination to achieve a desired result. By detecting the voltage between the electrode and workpiece by means that are well known in the art and are not illustrated, electric conditions can be changeably controlled.

Figure 3:
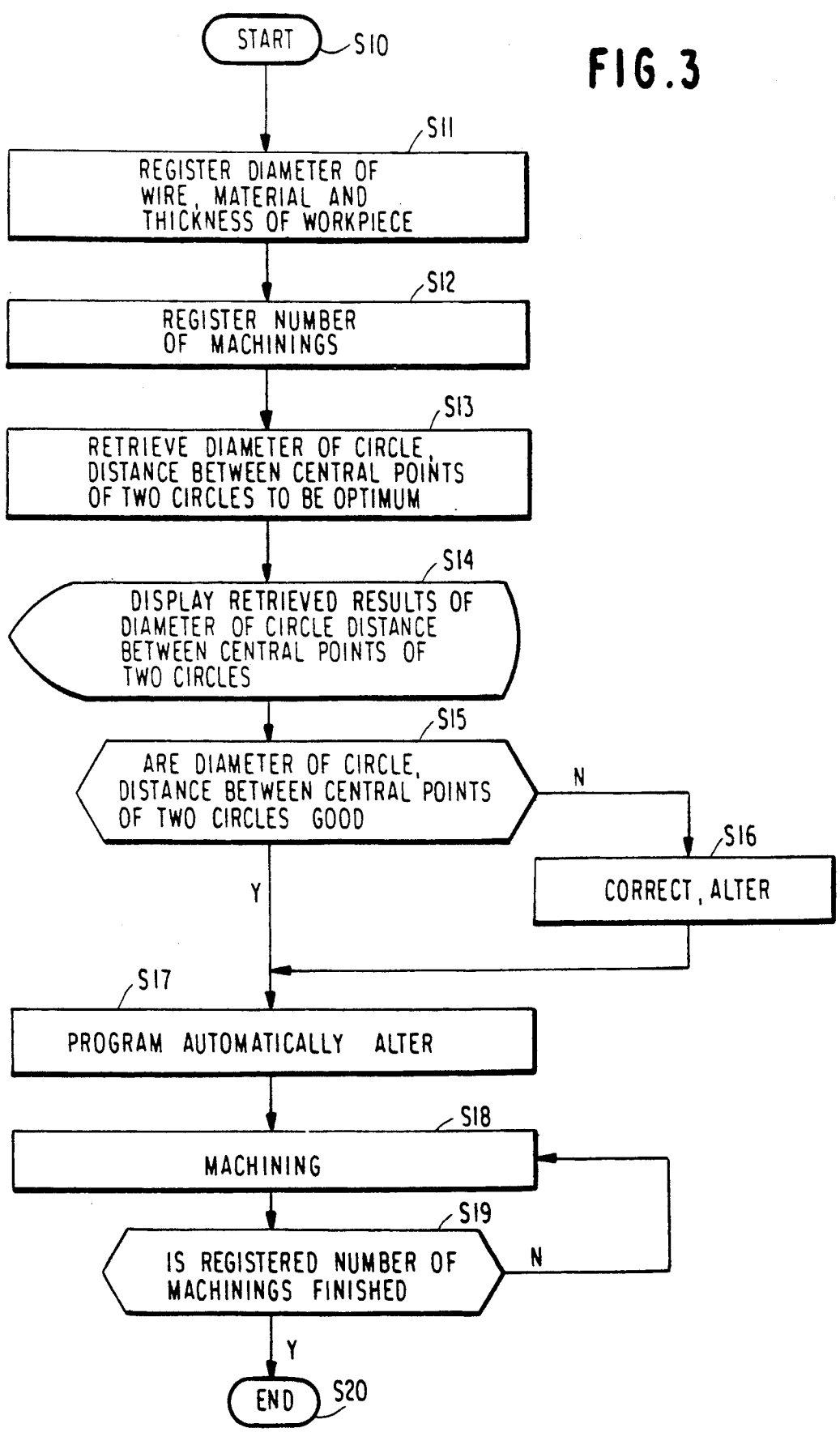
FIG. 3 is a flow chart of a machining method according to an embodiment of the invention.

FIG. 3 is a flow chart for explaining the machining method according to this invention.

The machining method according to this embodiment will be described with reference to the flow chart of FIG. 3. Initially (Step S-11) operational parameters, such as the diameter of the wire electrode 1 to be used as well as the material and thickness of the workpiece 2, are registered in the memory 12. In addition, the deviation of the machining from the predetermined entrance line and the intersection point of the machining with the entrance line at point P100 can be predetermined in a look-up table, for given combinations of parameters related to the current electrode, workpiece and applied power. In the example given, a portion of the entrance machining will follow the arc of a circle, but other geometric paths may be chosen which result in the entrance line intersecting the desired contour at approximately an obtuse (greater than 90°) angle. As to the illustrated circle in FIG. 1, the radius R of an optimum circle and the distance between the central points of the two circles (the distance between P300 and P400) may be predetermined such that the intrusion becomes minimum. At Step S-12, the desired number of machinings also is registered in memory 12.

At step S-13, the parameters registered in the memory 12 (such as the diameter of the wire electrode 1, the power level, the material and thickness of the workpiece 2, the number of machinings, the radius R of the circles and the distance between the central points of the two circles) are used to calculate the optimum diameter of the entrance machining circles and the central points between the two entrance machining circles. The calculated radius and central point parameters may be retrieved at step S-14 and an image of the machining locus may be displayed on a display (not shown).

The radius R of the circle and the distance between the central points of the two circles are confirmed (Step S-15). If the operator decides that there is need for an alteration, a correction may be made at this time using operator-selected numerical values (Step S-16). After the correction, the machining program in memory 12 for the original predetermined entrance line is automatically altered (step S-17). In this regard, the program converting unit 13 in CPU 11 will consider the specified entrance machining parameters, comprising radius R of the circles and the distance between the central points of the two circles in the illustrated example, and modify the program that is registered in the memory 12.

Finally, the power source 8 is turned ON by the altered program through the CPU to start machining at Step S-18. Each time the shape machining of the predetermined machining line is finished, a judgment is made as to whether or not the workpiece has been machined for the number of machinings registered in the memory 12 at step S-19). As a result, the workpiece is machined a registered predetermined number of times while altering the machining conditions to complete the shape machining.

Figure 5:
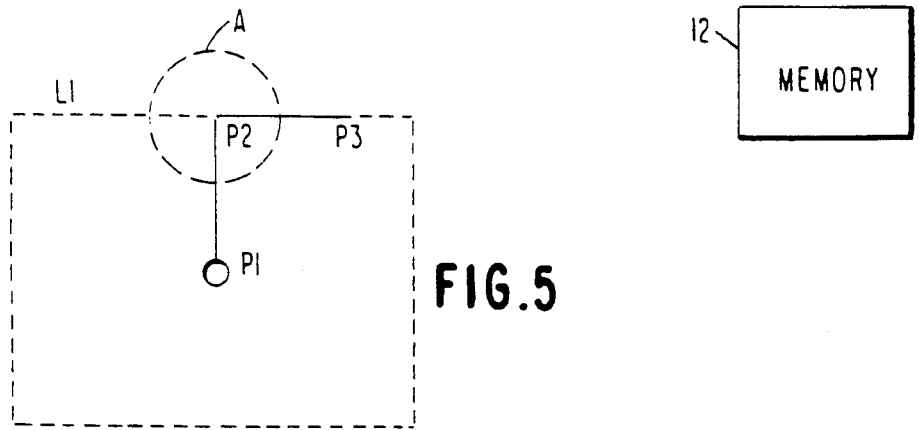
FIG. 5 is a schematic view showing the moving line of a wire electrode according to the conventional wire electric discharge machining method.
Figure 6:
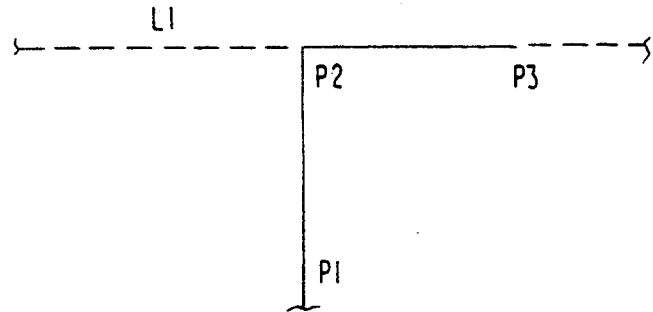
FIG. 6 is an enlarged view of a portion A of FIG. 5.

The automatic conversion of the original program by the program converting unit 13 may be described with respect to the machining of the shape illustrated in FIG. 5. First, assume that an original program for a desired contour (the square hole of FIG. 5) specifies the machining of an entrance line (P1-P2) that is perpendicular to a machined line (L1) on that desired contour. The program converting unit determines, on the basis of the predefined machining parameters for the electrode 1 and workpiece 2, the optimum intersecting points of the wire electrode 1 with line L1. These points are offset from the original intersecting point P2. Accordingly, the machining must deviate from the original entrance line in order to reach those points, thereby avoiding a double machining at point P2. In the example, the intersection will occur at the intersecting points P200 and P30. These points are located equidistant from original starting point P2. The intersecting points may be provided according to the radius R of two circles and the distance between the central points of the two circles, which are set according to parameters such as the diameter of the wire electrode 1, the material and thickness of the workpiece 2 and the number of machinings. The points P300 and P400 are located at a distance from the corresponding points P200 and P30 equal to the radius R of the circle and in a direction toward the machining starting point P1. Circles C20 and C10 are defined using the points P300 and P400 as their centers. Then, tangential lines which extend from P1 and contact the circumferences of the circles C20 and C10 are assumed, and contact points P4 and P20 of the tangential line with the circles are provided. The originally programmed entrance line is modified to define a new entrance machining line for the wire electrode 1 using these points. The new entrance line data is transferred to the memory 12 through the CPU 11. In a similar fashion, the return line from the desired contour to the original entrance line may be determined. Either or both of the modified entrance line and return line can be used to avoid double machining of the workpiece on the desired contour.

The machining line of the wire electrode 1 by the automatically altered program will proceed as illustrated by the solid line in FIG. 1. Electric energy is supplied from the power source 8 to the wire electrode 1 to start machining of the workpiece 2 from the point P1. The wire electrode 1 is moved along a straight machining line extending from point P1 to point P4. Thereafter, the electrode is moved along a path which follows the circumference of circle C20 and crosses the original entrance line locus, and proceeds to intersect the desired machining profile at an obtuse angle (approximately 1800°) at the point P200. Finally, the electrode is moved according to the original program. As the machining of the desired contour along the original machining line based on the program is concluded, it is linearly moved from the point P40 to the point P30. At point P30, the altered parameters are engaged and the electrode is moved to the point P100, which is an intersection with the original entrance line locus, along the circumference of the circle C10 to point P20, and then is linearly moved from the point P20 to the point P1.

When it is moved from the point P1 to the point P4, or from the point P20 to the point P1, a correction amount for producing a machining size is input or removed. Since the machining line of the wire electrode 1 described above is provided, the wire electrode 1 does not follow a linear portion indicated by broken lines in FIG. 1 between the point P200 and the point P30. But, since electric energy is supplied from the power source 8 between the wire electrode 1 and the workpiece 2, an electric discharge is generated in an electric discharge gap formed between the wire electrode 1 and the workpiece 2. As a result, the portion indicated by a shaded part is machined and removed.

In the embodiment described above, the entrance line is provided to start an approach to the linear portion of a desired machining contour. A similar machining method may also be applied to define a modified entrance line for approaching a desired machining contour in the shape of a curve, such as a parabola, circle, ellipse or the like.

The same effects can be provided by forming a modified entrance machining line using a straight line, ellipse, parabola or the like in place of the circle, as the machining locus that engages the desired machining contour at an obtuse angle. Specifically, while the invention has been described with respect to an altered machining path that follows the arcs of circles C10 and C20, it should be clear that the path from points P4 to P200 or points P30 to P20 can be linear, some other curve, or even a stepped approximation of a curve. Of importance is that there will be a modification of the original machining path in order to avoid machining the same point twice during a single machining operation.

In FIG. 2, at least the CPU 11, the memory 12 and the program automatic converting means 13 may form a part of an unit.

According to the method and the apparatus of the present invention as described above, the same point is not machined twice on the machining line, and the machining line is automatically altered to permit a continuous machining operation. Therefore, the intrusion of the machining shape into the workpiece is eliminated and the workpiece is machined with high accuracy.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiments has been made only by way of example and that numerous changes in the details and arrangement of components may be made without departing from the spirit and scope of the invention as hereinafter claimed.

What is claimed is:

1. A wire electric discharge machining method for electric discharge-machining a workpiece along a predetermined programmed path comprising a predetermined contour of a product to be produced and an entrance line from a starting position to a predetermined intersection point with said predetermined contour comprising the steps of opposing a wire electrode and the workpiece at a predetermined gap, relatively moving said wire electrode and said workpiece and applying a voltage to said wire electrode and said workpiece, said wire electrode and said workpiece being relatively moved to machine along said predetermined programmed path on said workpiece, the improvement comprising:

modifying at least a portion of said predetermined programmed path to machine a modified entrance line so that a peripheral surface of said electrode intersects said predetermined contour at a modified intersection point that is offset from said predetermined intersection point and said peripheral surface departs from said predetermined contour at a point other than said modified intersection point.

2. A wire electric discharge machining method according to claim 1, wherein a portion of the machining entrance line from the machining starting position of said workpiece to said predetermined contour and a portion of the machining line from said predetermined contour to said entrance line comprise curves.

3. A wire electric discharge machining method according to claim 2, wherein at least one of said curves comprises the arc of a circle.

4. A wire electric discharge machining method according to claim 1, wherein the machining locus of the entrance line to the predetermined machining line and the machining locus from the predetermined machining line to the entrance line are altered in response to at least one of the diameter of said wire electrode, the material and thickness of said workpiece, and the number of machinings of the workpiece.

5. A wire electric discharge machining method according to claim 1, wherein the modified entrance line intersects said predetermined contour at said modified intersection point at one of an obtuse angle and a tangent.

6. A wire electric discharge machining method according to claim 4, further comprising modifying said voltage during the machining of at least part of said altered machining locus.

7. A wire electric discharge machining method according to claim 4, wherein said altering is performed automatically.

8. A wire electric discharge machining apparatus comprising:

moving means for relatively moving a wire electrode and a workpiece;
a power source for applying a voltage between said wire electrode and said workpiece;
control means for programmably controlling said moving means to move a peripheral surface of said electrode along a predetermined machining line from a machining starting position, along an entrance line, to a predetermined intersection with a desired machining contour and from said desired machining contour to an intersection with said entrance line, the improvement comprising:
a program automatic converting means for modifying at least said entrance line so as to cause said peripheral surface to intersect said desired machining contour at a modified intersection point, said peripheral surface departing from said desired machining contour at a point other than said modified intersection point.

9. The wire electrode discharge machining apparatus of claim 8, wherein said program automatic converting means comprises means for modifying the machining electrical parameters during at least a portion of said modified machining line.

10. The wire electrode discharge machining apparatus of claim 9, further comprising means for detecting the electrical parameters between the workpiece and the wire electrode.

11. The wire electrode discharge machining apparatus of claim 8, wherein the starting position is a hole within the workpiece.

12. The wire electrode discharge machining apparatus of claim 8, wherein the starting position is outside of the workpiece.

13. A wire electric discharge machining method for electric discharge-machining a workpiece along a predetermined programmed path comprising a predetermined contour and an entrance line from a starting position to a predetermined intersection point with said predetermined contour comprising the steps of opposing a wire electrode and the workpiece at a predetermined gap, relatively moving said wire electrode and said workpiece and applying a voltage to said wire electrode and said workpiece, said wire electrode and said workpiece being relatively moved to machine along said predetermined programmed path on said workpiece, the improvement comprising:

modifying at least a portion of said predetermined programmed path to machine a modified entrance line that intersects said predetermined contour at a modified intersection point that is offset from said predetermined intersection point, a portion of said modified entrance line and a portion of a machining line from said predetermined counter to said entrance line comprising curves, at least one of said curves comprising a portion of a circle.

* * * * *